(12) United States Patent
Klampfer

(10) Patent No.: US 6,196,256 B1
(45) Date of Patent: Mar. 6, 2001

(54) MANIFOLD

(75) Inventor: Johann Klampfer, Vienna (AT)

(73) Assignee: Multitherm Fussbodenheizung GmbH & Co. KG, Vienna (AT)

( * ) Notice: Subject to any disclaimer, the term of this patent is extended or adjusted under 35 U.S.C. 154(b) by 0 days.

(21) Appl. No.: 09/525,605

(22) Filed: Mar. 14, 2000

(30) Foreign Application Priority Data

Apr. 16, 1999 (AT) .................................................. 256/99 U

(51) Int. Cl.⁷ .................................................... F16L 41/00
(52) U.S. Cl. ........................................ 137/269; 285/133.1
(58) Field of Search ..................................... 137/269, 884; 285/133.1

(56) References Cited

U.S. PATENT DOCUMENTS

| | | | |
|---|---|---|---|
| 3,506,029 | * | 4/1970 | Demler et al. ..................... 285/133.1 |
| 4,782,852 | * | 11/1988 | Legris ..................................... 137/269 |

FOREIGN PATENT DOCUMENTS 000 487  11/1995 (AT) .

* cited by examiner

Primary Examiner—John Fox
(74) Attorney, Agent, or Firm—Collard & Roe, PC

(57) ABSTRACT

A manifold for fluids, in particular for heating installations, with the manifold having several mutually couplable housings (1), in particular for receiving valves, flowmeters or thermal sensors, with the housings (1) having a main conduit (2) which is continuous in the axial direction and at least one transversal conduit (16) which is connected with the same, and with a neck (3) which extends in the axial direction of the main conduit (2) and can be inserted into an enlargement (4) of the main conduit (2) of the adjacent housing (1) and a jacket surface (6) of said neck (3) is provided with at least one receiver for a sealing ring. In order to compile such a manifold in a simple way it is provided that the neck (3) carries at least one radially projecting cam (7) which is a part of a bayonet catch (7, 9) and co-operates with recesses (9) in the interior wall (8) of the enlargement (4), with the recesses (9) being provided with sections (10, 11) which extend in the axial direction and approximately in the circumferential direction.

3 Claims, 3 Drawing Sheets

MANIFOLD

The invention relates to a manifold in accordance with the preamble of claim 1.

Such a manifold has become known by AT 487 U1 for example.

In this known manifold several housings can be inserted with their necks into an enlargement of the main conduit of the respectively adjacent housing. For securing the mutual position and for securing the unity of two housings, open recesses are provided on the face sides of the housings and on their jacket surfaces, which open recesses are provided with an enlargement at a distance from the associated face side. Small "dog-bone-like" plates are pressed substantially perpendicularly to the jacket surfaces of the housing into the recesses of two mutually adjacent housings.

This leads to the disadvantage, however, that the recesses and the small plates must be produced with a respectively high precision in order to ensure a secure unity of the housings and to avoid undesirable mutual movements of the housings of a manifold.

Moreover, this solution leads to the further disadvantage that plates can easily be lost during on-site assembly, particularly at larger construction sites. Assembly can only be continued when new plates have been procured.

It is the object of the present invention to avoid such disadvantages and to provide a manifold of the kind mentioned above in which the individual housings can be rapidly connected with one another and where the loss of important parts during assembly is prevented.

This is achieved in accordance with the invention in a manifold of the kind mentioned above by the characterizing features of claim 1.

The proposed measures allow joining the housings of a manifold in a simple manner. It is sufficient to insert the housings to be connected into one another and to mutually twist the same against one another.

The sections of the recesses of the interior wall of the enlargement of the main conduit of the housing, which sections substantially extend in the circumferential direction, are provided with a small incline, thus resulting in a frictionally connecting bayonet catch. However, this leads to the necessity of adhering to relatively narrow tolerances in order to avoid major positional deviations, in particular a mutually twisted position of two mutually connected devices.

The features of claim 2 lead to the advantage of securing the mutual position of two mutually connected housings of a manifold. An incline of the sections of the interior wall of the enlargement of the housing which substantially extend in the circumferential direction can be omitted, with the latching noses and latching recesses determining the mutual position of the two mutually connected housings. The latching leads to a high amount of security against inadvertent detachment of the connection by vibrations for example, since a slight elastic deformation of the housing will occur particularly during the latching.

The features of claim 3 can be provided for further securing the position of the housing. The insertion of the securing plates only represents an additional securing measure and is not mandatorily required, so that a loss of such securing plates during the on-site assembly will not impair further assembly in any way whatsoever. The securing plates can also be inserted after completion of a manifold in accordance with the invention.

The invention is now explained in closer detail by reference to the enclosed drawings, wherein:

FIG. 1 shows an exploded view of two housings 1 of a manifold in accordance with the invention, with housing 1 being provided for receiving a valve or a flowmeter (not shown).

Figure 1:
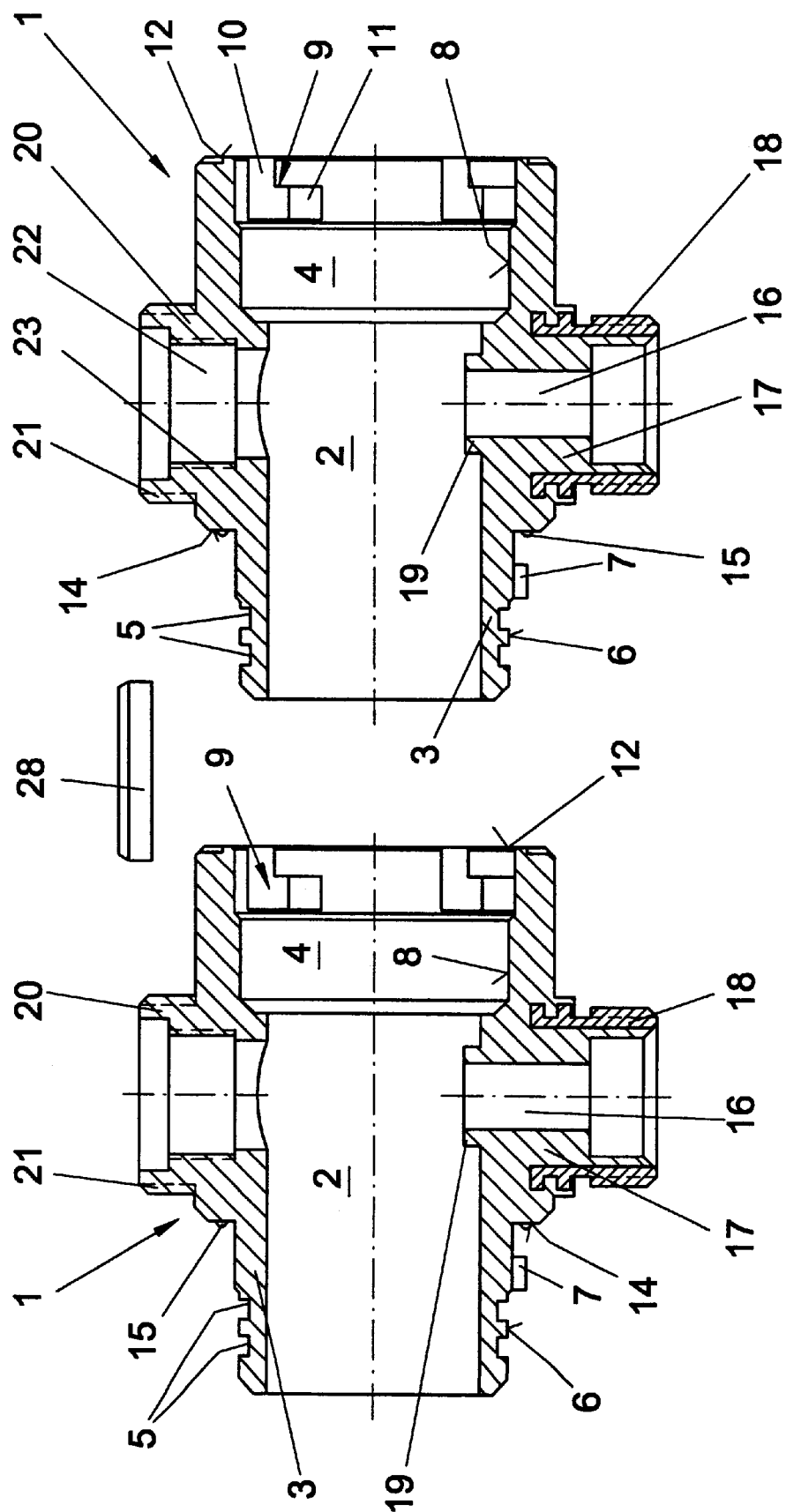
FIG. 1 shows an exploded view of a manifold in accordance with the invention.

Housings 1 are made of plastic and are provided with a continuous main conduit 2 which extends on one side through neck 3 extending in the axial direction and is provided on the second side with an enlargement 4.

A neck 3 of an adjacent housing 1 can be inserted into said enlargement 4, with the neck 3 being provided with two preferably circularly extending grooves 5 on its jacket surface 6, which grooves are provided for receiving sealing rings, and O-rings in particular (not shown).

Figure 3:
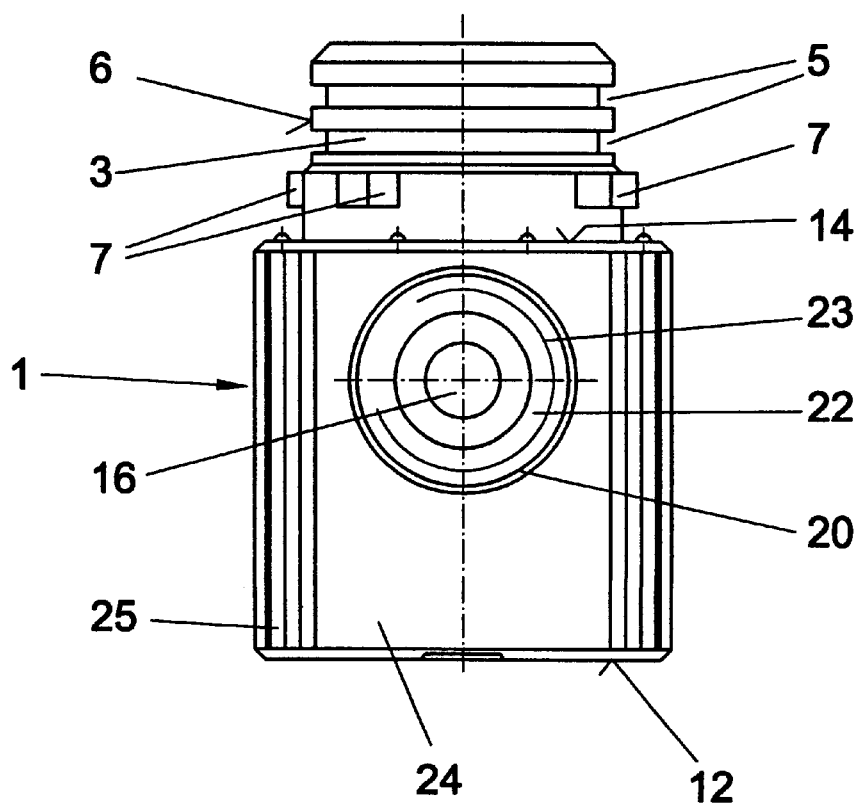
FIG. 3 shows a top view of a housing.

As is shown in particular in FIG. 3, neck 3 is provided with radially projecting cams 7 which co-operate with recesses 9 incorporated in the interior wall 8 of enlargement 4 and which jointly form a bayonet catch.

Recesses 9 are provided with a section 10 which is open on the face side and extends in the axial direction of the main conduit 2 and with a section 11 which is adjacent to the same and extends in the circumferential direction. Recesses 9 form a positive-locking bayonet catch jointly with the cams 7.

In order to secure the position of two mutually connected housings 1, the face side 12 of the housing 1 which is averted from the neck 3 is provided with latching recesses 13 (FIG. 2) into which latching noses 15, which are arranged on the opposite face side 14, latch under elastic deformation of housing 1 when two housings 1 are properly mutually connected by means of their bayonet catch 7, 9.

Housings 1 are provided with a transversal conduit 16 which penetrates a radially projecting neck 17 and opens into the main conduit 2 in the zone of flattening 19. A threaded sleeve 18 is cast into said neck 17, which sleeve 18 is provided with an external thread and allows the connection of a conduit by means of a union nut.

A further neck 20 which projects radially is provided axially opposite to the transversal conduit 16, which neck is provided with an external thread 21 and with a bore 22 which is in alignment with the transversal conduit 16, which bore opens into the main conduit 2. Bore 22 is provided with an internal thread 23 which is used for receiving a flowmeter (not shown) or a valve or a mounting for a valve body with which the transversal conduit 16 can be closed off. The external thread 21 is used for receiving a covering cap (not shown) for a flowmeter or a valve.

Figure 2:
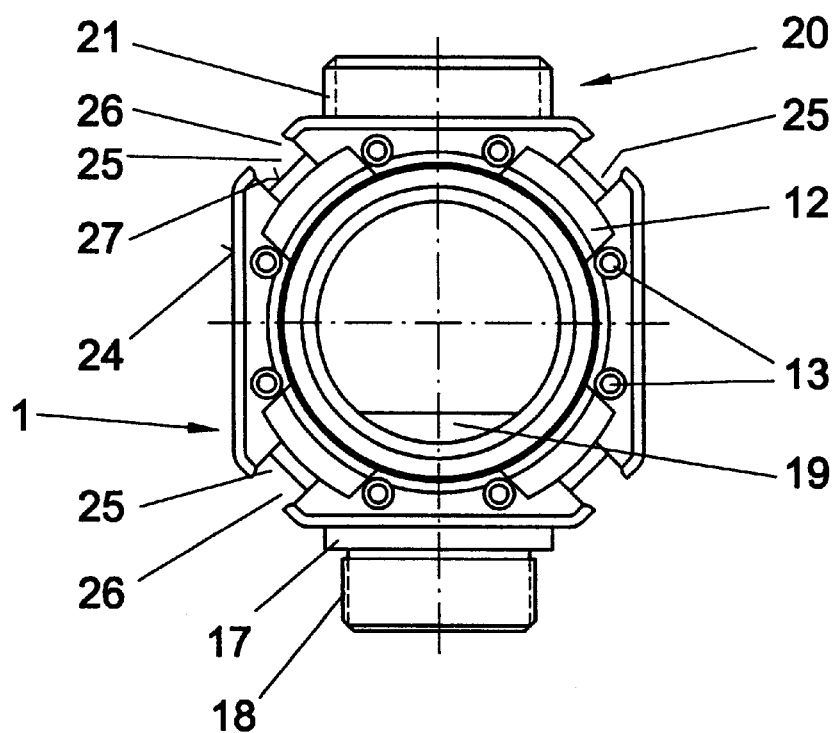
FIG. 2 shows a face side of a housing.

As is shown in particular in FIGS. 2 and 3, housings 1 are provided with continuous grooves 25 which are incorporated in their jacket surfaces 24. Said grooves 25 are provided with a slightly smaller width in the zone of the groove opening 26 than in the zone of their groove base 27 (FIG. 4).

Securing plates 28 can be inserted into said grooves 25 substantially perpendicular to the base 27 of the grooves 25 for the purpose of securing the mutual position of the mutually connected housings 1, with the width of said securing plates corresponding to the width of groove base 27. The securing plates 28 extend from the groove 25 of the one housing 1 to the respective groove 25 of the adjacent housing 1, as is schematically illustrated in FIG. 1.

Figure 4:
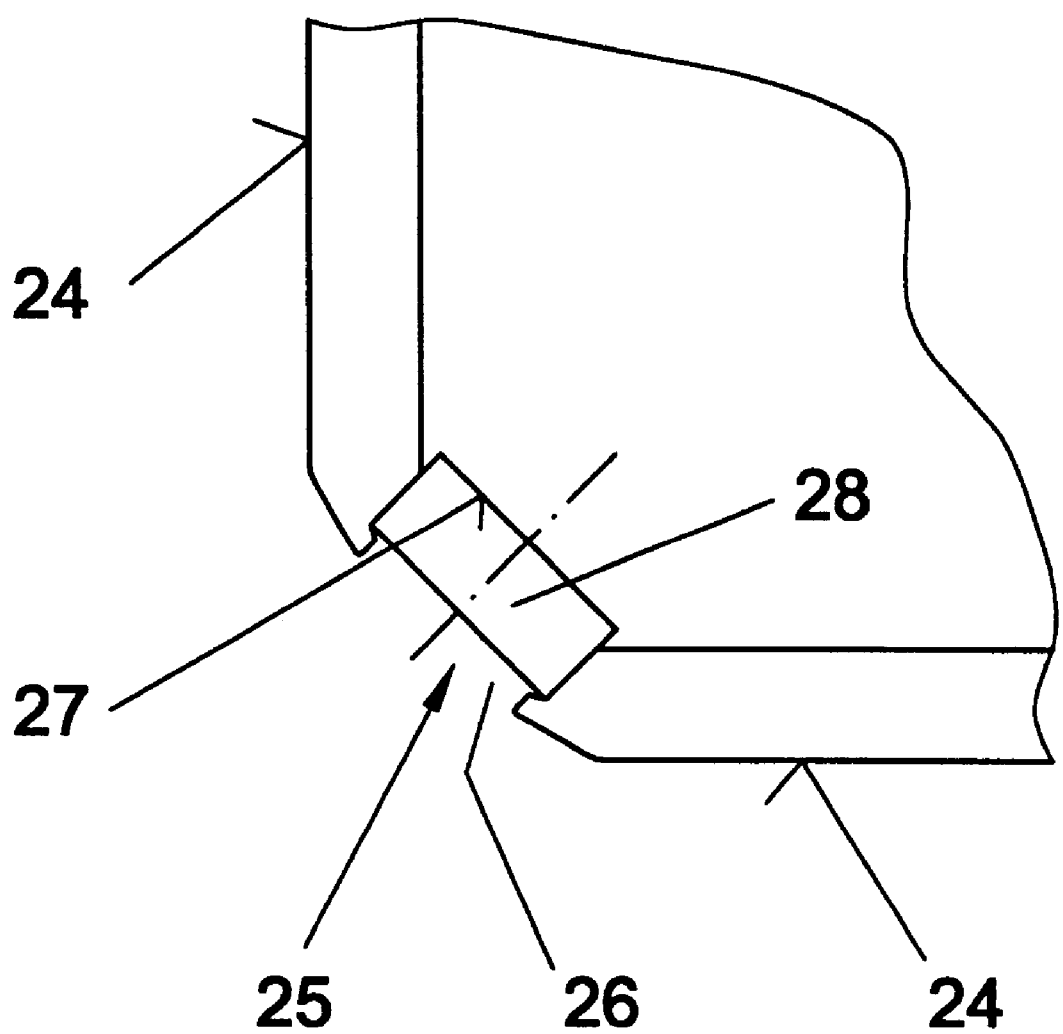
FIG. 4 shows a detail of a housing.

As is shown in FIG. 4, the securing plates 28 are provided with a height which corresponds to the clearance height of groove 25 between the groove base 27 and the lower edge of the constriction in the zone of groove opening 26.

To secure against further twisting it is merely necessary to insert a securing plate 28 in the grooves 25 of the two housings 1, which grooves are in alignment in two properly connected housings 1. Such a securing plate 28 is not mandatory, however, for securing the mutual position of the individual housings 1, since a high amount of security against the twisting of the two mutually connected housings 1 is given by the latching recesses 14 and the latching noses 15.

The housings 1 as exhibited in FIG. 1 are merely examples for housings of manifolds in accordance with the invention. Accordingly, the housings for the end zones of a manifold can also be closed off on one face side or its necks for receiving inserts such as valves, flowmeters, thermometers, etc. can be arranged appropriately according to the necessary requirements. The relevant aspect is merely that they are either provided with an enlargement having recesses 9 or a neck 3 with cams 7 in order to allow the connection with housing 1 by means of a bayonet catch 7, 9.

What is claimed is:

1. A manifold for fluids with the manifold having several mutually couplable housings (1) for receiving valves, flowmeters or thermal sensors, with the housings (1) having a main conduit (2) which is continuous in the axial direction and at least one transversal conduit (16) which is connected with the same, and with a neck (3) which extends in the axial direction of the main conduit (2) and can be inserted into an enlargement (4) of the main conduit (2) of the adjacent housing (1) and a jacket surface (6) of said neck (3) is provided with at least one receiver for a sealing ring, characterized in that the neck (3) carries at least one radially projecting cam (7) which is a part of a bayonet catch (7, 9) and co-operates with recesses (9) in the interior wall (8) of the enlargement (4), with the recesses (9) being provided with sections (10, 11) which extend in the axial direction and approximately in the circumferential direction.

2. A manifold as claimed in claim 1, characterized in that axially aligned latching noses (15) and latching recesses are formed on or incorporated into the two mutually facing face sides (14, 12) of two mutually adjacent housings (1), which noses and recesses latch together in the latching position of the bayonet catch (7, 9).

3. A manifold as claimed in claim 1 in which the housings are provided with recesses which are incorporated into their outer jacket surfaces, are open in the zone of their face sides, extend in the axial direction of the main conduits (2) and are in alignment in the assembled state of the housings, characterized in that the recesses are formed by grooves (24) which are provided with side walls extending continuously axially to the main conduit, with the grooves (24) having a slightly larger width in the zone of their base than in the zone of their opening (26) and being used for receiving elastically deformable securing plates (28) which are provided with a continuous trapezoid cross section and extend beyond the border zones of mutually adjacent housings (1).

* * * * *